United States Patent [19]

Iijima et al.

[11] 4,408,713
[45] Oct. 11, 1983

[54] CONTROL FOR AUTOMOBILE AIR CONDITIONING SYSTEM

[75] Inventors: Tetsuya Iijima, Yamato; Seiichi Takahashi, Tokyo, both of Japan

[73] Assignee: Nissan Motor Co., Ltd., Yokohama, Japan

[21] Appl. No.: 317,863

[22] Filed: Nov. 3, 1981

[30] Foreign Application Priority Data

Nov. 4, 1980 [JP] Japan .................... 55-153721

[51] Int. Cl.³ .................. F24F 7/00; G05D 23/00
[52] U.S. Cl. .................... 236/49; 236/46 F; 236/DIG. 9; 165/12; 165/16; 165/43; 98/2.01
[58] Field of Search .............. 236/49, DIG. 9, 46 R, 236/46 A, 46 C, 46 F, 13; 165/12, 16, 39, 40, 96, 43; 62/158, 157, 186, 231; 98/2.01, 2.06, 2.08

[56] References Cited

U.S. PATENT DOCUMENTS

| | | |
|---|---|---|
| 3,263,739 | 8/1966 | Gaskill et al. . |
| 3,505,828 | 4/1970 | Vander Molen et al. . |
| 3,653,589 | 4/1972 | McGrath ........................ 236/49 |
| 3,656,541 | 4/1972 | Coyle et al. . |
| 3,668,497 | 6/1972 | Freiberger et al. . |
| 3,774,676 | 11/1973 | Franz . |
| 3,948,152 | 4/1976 | Asakai et al. ................ 236/49 |

FOREIGN PATENT DOCUMENTS

| | | | |
|---|---|---|---|
| 53-34227 | 3/1978 | Japan .................. 236/DIG. 9 |
| 56-10640 | 2/1981 | Japan .................. 165/16 |

*Primary Examiner*—Albert J. Makay
*Assistant Examiner*—Harry Tanner
*Attorney, Agent, or Firm*—Lowe, King, Price & Becker

[57] ABSTRACT

An automobile air conditioning system is provided with a control system for controlling the flow rate of hot or cool air discharged into the passenger compartment. The air flow rate is controlled in relation to the sensed value of the ambient air temperature and the temperature of a heat source of the air conditioning system. If the sensed temperatures are lower than predetermined reference levels, the air flow rate is gradually increased at a moderate increasing rate. The air flow rate is more rapidly increased when the sensed heat source temperature is higher than the reference level.

20 Claims, 9 Drawing Figures

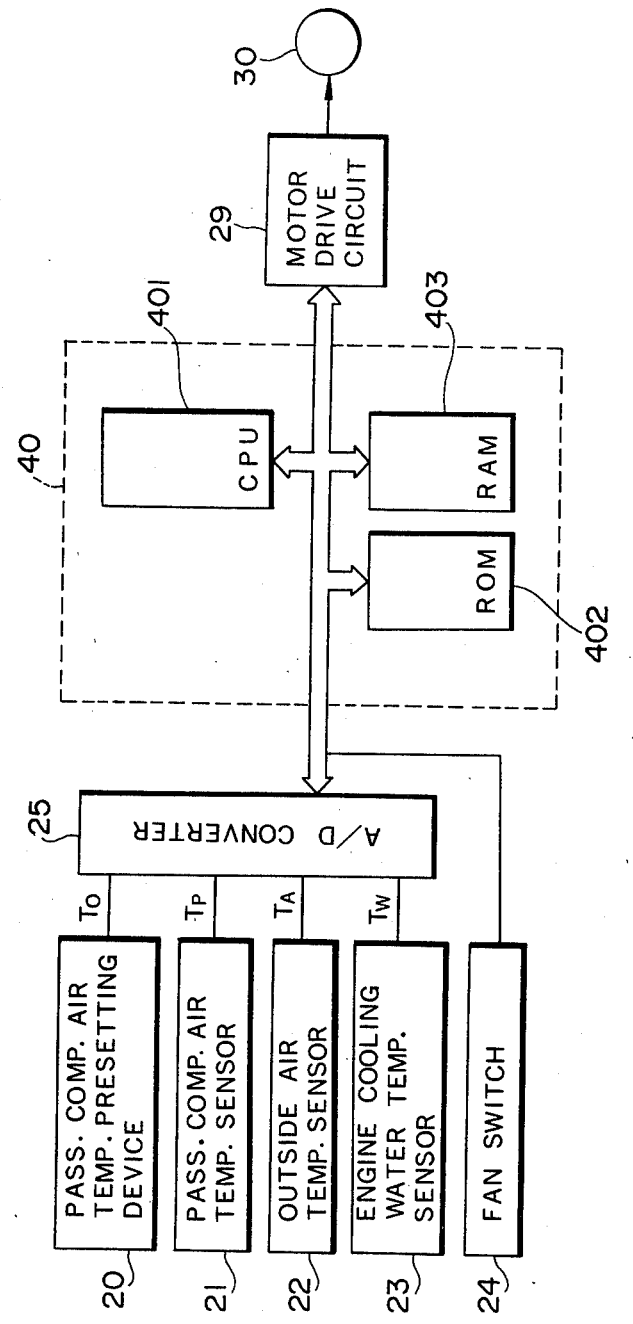

CONTROL FOR AUTOMOBILE AIR CONDITIONING SYSTEM

BACKGROUND OF THE INVENTION

1. Field of the Invention

The present invention relates to an air quantity control method and system for an automobile air conditioning system.

2. Description of the Prior Art

In recent years, automotive vehicles are being equipped with an air conditioning system which provides more comfortable environment for the vehicle occupants.

In a conventional air conditioning system, the air flow rate is determined in accordance with the opening degree of an air mix door provided for controlling the air temperature.

Such prior art air conditioning system is, however, often beset with a problem that the air flow rate is undesireablly high at the beginning of the air conditioning operation because the air mix door is in the fully open state or the fully closed state.

A more detailed description of the prior art air conditioning system is made hereinafter with reference to the accompanying drawings in the section entitled DETAILED DESCRIPTION OF THE PREFERRED EMBODIMENT.

SUMMARY OF THE INVENTION

It is an object of the invention to provide an air quantity control method and system for an automobile air conditioning system in which the air flow rate is gradually increased when an ambient temperature is under a predetermined ambient temperature condition.

In accordance with the present invention, a blower fan speed is controlled according to two predetermined modes of operation. In a first mode, the blower fan speed is gradually increased with time, when at least an air conditioner heat source temperature is lower than a predetermined level under the predetermined ambient temperature condition. In a second predetermined mode of operation, the blower fan speed is more rapidly increased than in the first mode of operation when the heat source temperature is higher than the predetermined level under the predetermined ambient temperature, or when the ambient temperature condition is other than said predetermined ambient temperature condition. In both the first and second modes of operation, the blower fan speed is increased until it reaches an upper limit level of blower fan speed, which varies in proportion to the absolute value of the temperature difference between an actual value and a desired preset value of the passenger compartment air temperature.

BRIEF DESCRIPTION OF THE DRAWINGS

FIG. 3(B) is a schematic block diagram of a second embodiment of air quantity control system according to the present invention;

DESCRIPTION OF THE PREFERRED EMBODIMENTS

Figure 1:
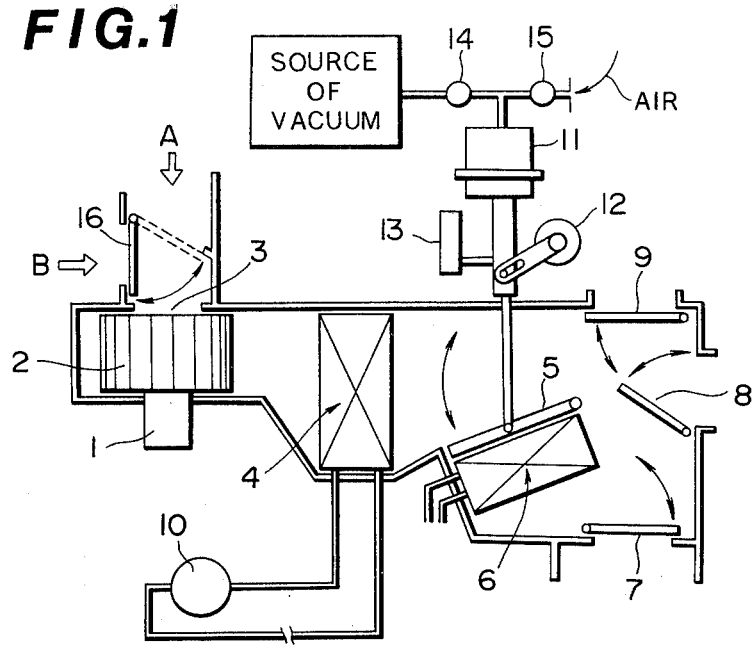
FIG. 1 is a diagrammatic illustration of an air conditioning system.

In order to facilitate understanding of the present invention, reference is first made to FIG. 1 in which an air conditioning system is illustrated.

In FIG. 1, air is introduced through an air intake 3 by a blower fan 2 driven by a motor 1, and cooled by a cooling unit such as an evaporator 4. After being cooled, a part of the air is introduced into a heater unit 6 via an air mix door 5 which proportions the amount of the air passing through the heating unit 6. The heated part of the incoming air is then mixed again with the unheated remaining part of the incoming air in order to obtain a conditioned air of a desired temperature. The mixed air is then discharged through a plurality of outlet ducts 7, 8 and 9 into a passenger compartment.

A reference numeral 10 denotes a compressor of the cooling unit. The air mix door 5 is actuated by an actuator 11, which is controlled by a solenoid valve 14 for introducing a vacuum pressure within an engine intake manifold and a solenoid valve 15 for establishing a fluid communication between the actuator 11 and the atmosphere.

An air intake door 16 is provided to select air coming into the air conditioning system. When the air intake door 16 takes the position shown by the solid line in FIG. 1, only outside air is allowed to enter the system as shown by the arrow A, thereby refreshing the air in the passenger compartment. When, on the other hand, the air intake door 16 takes a position shown by the dashed line in FIG. 1, the air within the passenger compartment is recirculated into the system, thereby providing efficient cooling or heating.

Figure 2:
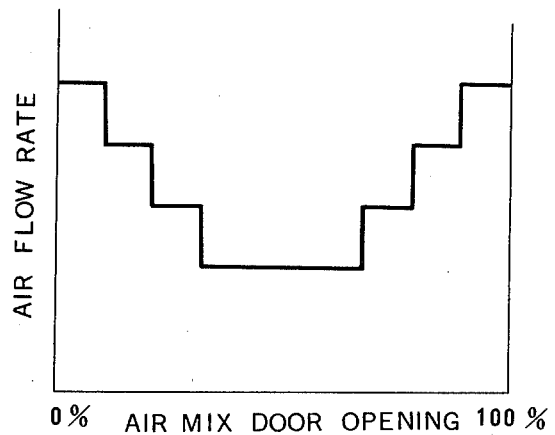
FIG. 2 is a graph showing an air flow control characteristic of a prior art air conditioning system.

In such an air conditioning system, the flow rate of the air is generally controlled depending on the opening degree of the air mix door 5. The relation between the air flow rate and the air mix door opening is illustrated in FIG. 2.

With the air mix door 5 as shown, the air flow rate is maximized both in a full hot operation, where the air mix door is fully opened for the maximum heating operation, and in a full cool operation where the air mix door is fully closed for the maximum cooling operation. Thus, the air flow rate is controlled in accordance with the opening position of the air mix door 5 in this air conditioning system.

When the ambient temperature level is very high or very low, the air conditioning system, must operate in the fully hot operation or the fully cool operation for a relatively long time at an air conditioning start period. However, such operation is uncomfortable to the vehicle occupants since hot or cool air is discharged into the passenger compartment at a high flow rate from the very beginning of the air conditioning operation. Also, if the engine coolant is not sufficiently warmed up, undesirably cold air is discharged into the passenger compartment during a period after the engine starting.

Therefore, a more appropriate control of the blower fan speed is required.

The present invention is explained hereinafter with reference to the accompanying drawings.

Figure 3A:
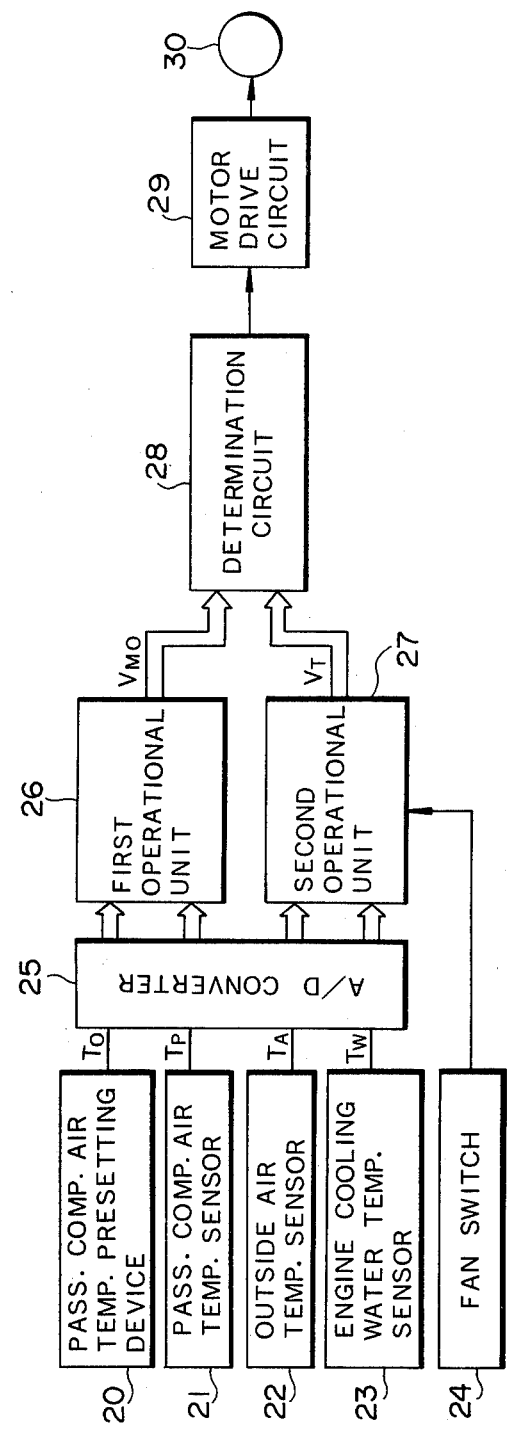
FIG. 3(A) is a schematic block diagram of an embodiment of air quantity control system according to the present invention.

FIG. 3(A) shows a schematic block diagram of a first embodiment of the air quantity control system according to the present invention.

As shown, the system comprises a device 20 for presetting a desired value of a passenger compartment air temperature $T_O$, a sensor 21 for sensing an actual value of the passenger compartment air temperature $T_p$, a sensor 22 for sensing an outside air temperature $T_A$, and a sensor 23 for sensing an engine cooling water temperature $T_W$. The output analog signals of the presetting device 20 and sensors 21 to 23 are converted into digital signals at an analog to digital converter 25. The output digital signals of the analog to digital converter 25 are sent to first and second operational units 26 and 27 which perform prescribed operations to provide drive voltages $V_{MO}$ and $V_T$ both for a blower fan motor 30. An output signal of a fan switch 24 is also sent to the second operational unit 27. A determination circuit 28 receives the drive voltages $V_{MO}$ and $V_T$ from the first and second operational units 26 and 27, and outputs a smaller one thereof to a motor drive circuit 29.

In accordance with the output signal from the determination circuit 28, the motor drive circuit 29 provides a drive current to the blower fan motor 30. Thus, the speed of the blower fan motor, i.e. the air flow rate, is controlled in accordance with drive voltages $V_{MO}$ and $V_T$ produced by the operational units 26 and 27.

The functions of the operational units 26 and 27 are explained as follows.

Figure 4:
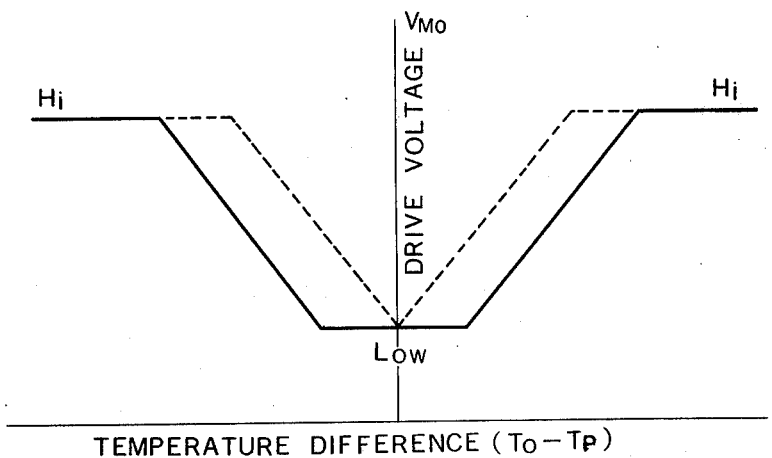
FIG. 4 is a graph showing a characteristic curve of an upper limit of blower fan motor drive voltage.

FIG. 4 shows a characteristic curve of the drive voltage $V_{MO}$ produced by the first operational unit 26. The first operational unit 26 includes a memory in which the data of the preset passenger compartment air temperature $T_O$ and the actual passenger compartment air temperature $T_P$ are stored. In accordance with the stored data of $T_O$ and $T_P$, the first operational unit 26 produces the drive voltage $V_{MO}$ as an upper limit of the blower fan motor drive voltage $V_M$ in a timer control mode which is described hereinafter. As shown in FIG. 4, the drive voltage $V_{MO}$ is determined as a function of the absolute value of the temperature difference between $T_O$ and $T_P$. When a temperature difference is larger than a predetermined reference value, the drive voltage $V_{MO}$ is maintained at a maximum level. The solid line curve in the FIG. 4 shows the voltage characteristic for an increase in the difference $|T_O - T_P|$, and the dashed line curve in the figure shows a characteristic for a decrease in the difference $|T_O - T_P|$.

Figure 5:
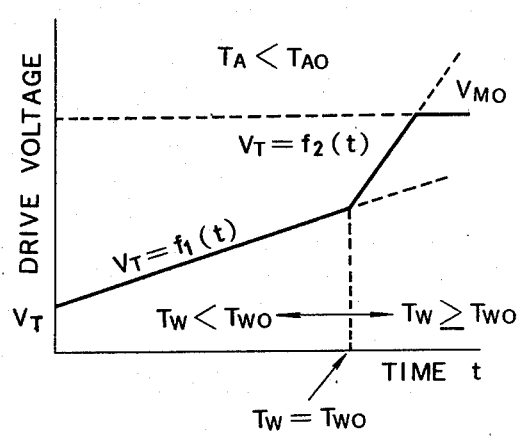
FIG. 5 is a graph showing a blower fan motor drive voltage produced in a first control mode.

Nextly, the function of the second operational unit 27 is explained with reference to FIGS. 5 and 6. The operation of the second operational unit 27 is initiated by the closing of the fan motor switch 24 and it is called a "timer control mode." In this timer control mode, the operational unit 27 produces the drive voltage signal $V_T$ which gradually increases with time, and the increasing rate thereof is determined in accordance with the sensed values of the outside air temperature $T_A$ and the engine cooling water temperature $T_W$. As shown in FIG. 5, when the outside air temperature $T_A$ is below a predetermined reference level $T_{AO}$, the second operational unit 27 produces the drive voltage $V_T$ in accordance with a first and second functions $f_1(t)$ and $f_2(t)$ depending on whether or not the engine cooling temperature $T_W$ reaches a predetermined reference level $T_{WO}$. Specifically, the first function $f_1(t)$ is selected when the engine cooling water temperature $T_W$ is lower than the reference level $T_{WO}$, and the second function is selected when the engine cooling water temperature is equal to or higher than the reference level $T_{WO}$. Practically, during a period after a cold engine starting, the engine cooling water temperature $T_W$ is low, and therefore, the first function $f_1(t)$ is selected. In accordance with the first function $f_1(t)$, the drive voltage $V_T$ increases with time at a first constant increasing rate having a moderate value. When the engine cooling water temperature rises above the reference level, the drive voltage is produced in accordance with the second function $f_2(t)$ whereby the drive voltage $V_T$ increases with time at a second increasing rate greater than the first increasing rate.

On the other hand, when the outside air temperature $T_A$ is equal to or higher than the reference level $T_{AO}$, the second function $f_2(t)$ is selected. Accordingly, as shown in FIG. 6, the second function $f_2(t)$ is selected under the condition where the outside air temperature $T_A$ is higher than the reference level $T_{AO}$ or the engine cooling water temperature $T_W$ is higher than the reference level $T_{WO}$.

Figure 6:
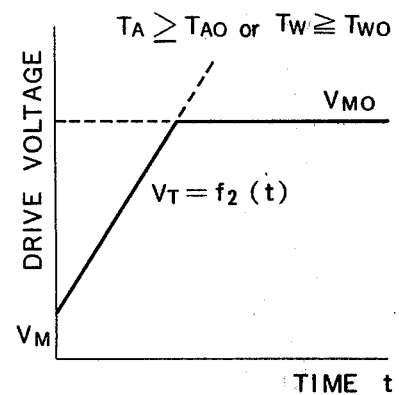
FIG. 6 is a graph showing a blower fan motor drive voltage produced in a second control mode.

When the drive voltage $V_T$ produced in accordance with the functions $f_1(t)$ or $f_2(t)$ reaches the voltage value $V_{MO}$ determined by the first operational unit 26, the blower fan drive voltage $V_M$ is maintained at the voltage value $V_{MO}$ as shown in FIGS. 5 and 6.

The operation of the above system is such that when the outside air temperature is low and the engine cooling water temperature is low during a period after cold engine starting, the flow rate of the air discharged from the air conditioning system is gradually increased from zero, and the increasing rate of the flow rate is increased when the engine cooling water temperature reaches a predetermined level. Thus the air appropriately conditioned by the air conditioning system is efficiently supplied into the passenger compartment. On the other hand, when the outside air temperature or the engine cooling water temperature is higher than the predetermined level, the air flow rate is rapidly increased from immediately after the actuation of the fan switch. This is because discharging air temperature is appropriately controlled by the air conditioning system under such a condition.

Reference is now made to FIG. 3(B) in which a second embodiment of the present invention is diagrammatically illustrated. As shown, this embodiment features that the first and second operational units 26 and 27 and the determination circuit 28 shown in FIG. 3(A) are replaced by a microcomputer 40. The microcomputer 40 includes a central precessing unit (CPU) 401 to execute various arithmetic operation in accordance with stored programs, a read only memory (ROM) 402 which stores the programs, and a random access memory (RAM) 403 in which various data and calculated results are stored during excution of arithmetic operations. The data representing various temperatures from the analog to digital converter 25 and signal from the fan switch 24 are fed to the microcomputer 40.

The operation of the microcomputer 40 is then explained with reference to the flow chart shown in FIGS. 7 and 8.

Figure 7:
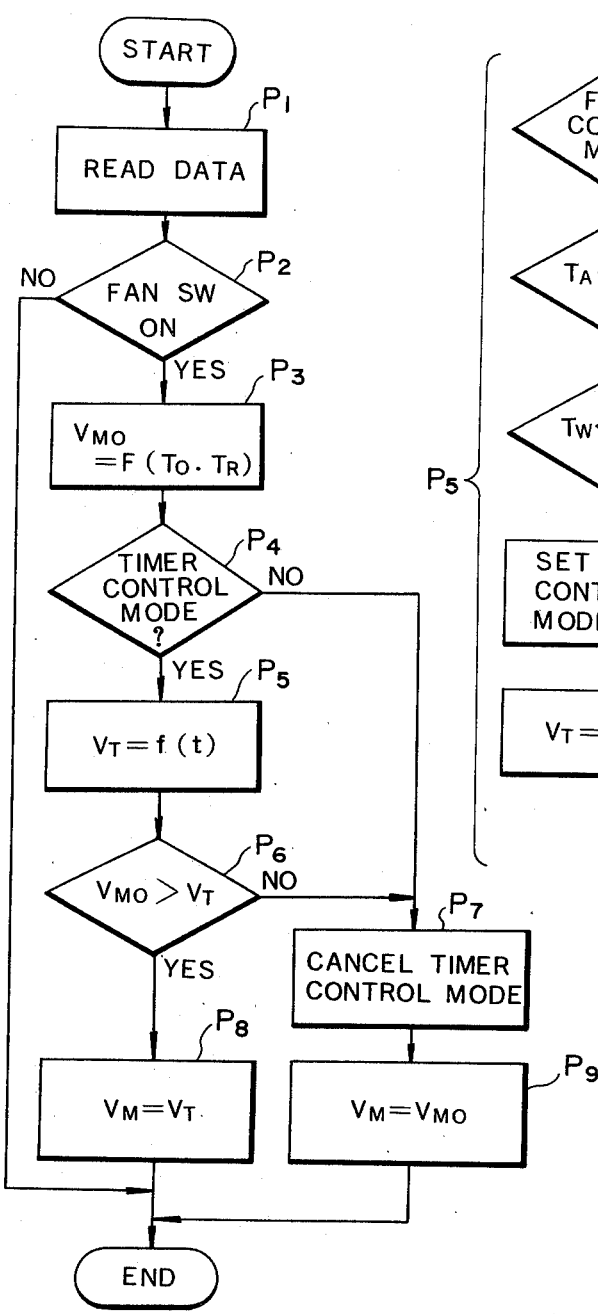
FIG. 7 is a flow chart showing the operation of the control system shown in FIG. 3(B)

Reference is first made to FIG. 7 in which a general flow chart descriptive of the system operation is shown. After the initiation of the program, the data of the temperatures and the fan motor switch position are read in a step $P_1$. Then, in a step $P_2$, it is determined whether or not the fan switch is turned on is determined. If the answer is "yes," the program goes to a step $P_3$ in which the drive voltage $V_{MO}$ is produced in accordance with the difference between the preset passenger compartment air temperature $T_O$ and the actual passenger compartment air temperature $T_P$.

The characteristic of the drive voltage $V_{MO}$ employed here is the same as the previous embodiment and shown in FIG. 4.

Then, in a step $P_4$, a detection is made of a result of the previous cycle of the program execution, viz, whether or not the system operates in the timer control mode in which the voltage $V_T$ calculated in accordance with the functions $f_1(t)$ of $f_2(t)$ is selected. If the system has operated in the timer control mode, vis, the answer is "yes," the program goes to a step $P_5$ for the timer control mode operation. In the step $P_5$, the drive voltage $V_T$ is produced in accordance with the predetermined functions $f_1(t)$ and $f_2(t)$. The operation in this step $P_5$ is explained later with reference to a flow chart shown in FIG. 8. In a step $P_6$, the drive voltage produced in the step $P_3$ is compared with the drive voltage $V_T$ produced in the step $P_5$. If the voltage $V_{MO}$ is higher than the voltage $V_T$, the program goes to a step $P_8$ where the blower fan motor drive voltage $V_M$ is determined as equal to the drive voltage $V_T$, ($V_M = V_T$). If the answer is "no" in the step $P_6$ as well as in the step $P_4$, the program goes to a step $P_7$ where the timer control mode is cancelled, and then goes to a step $P_9$ where the blower fan motor drive voltage $V_M$ is set to a value equal to the drive voltage $V_{MO}$ produced in the step $P_3$ ($V_M = V_{MO}$).

Figure 8:
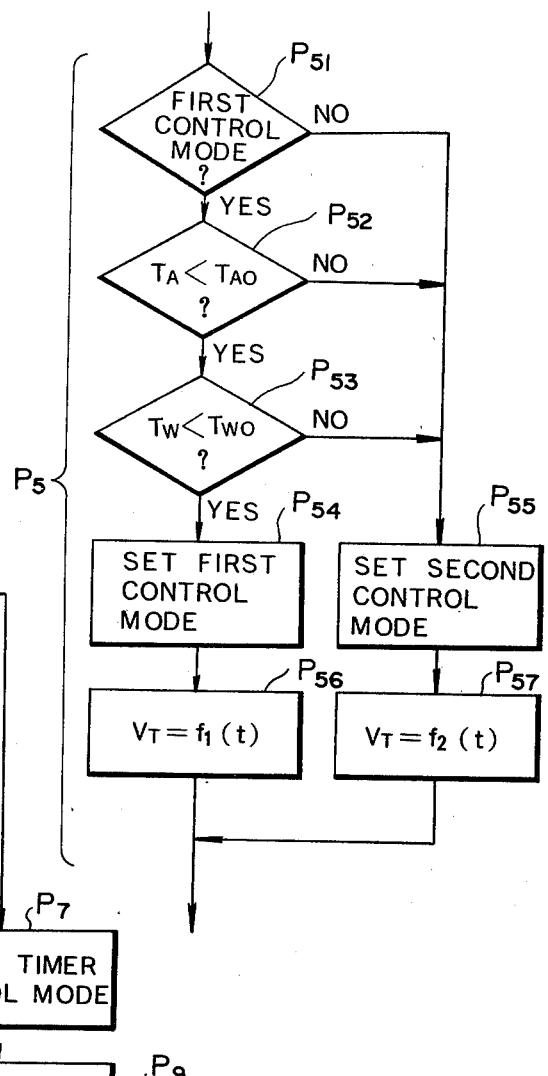
FIG. 8 is a flow chart showing a timer control mode shown in FIG. 7.

Referring to FIG. 8, the timer control mode in the step $P_5$ is explained.

In a step $P_{51}$, a determination is made of a result of the previous cycle of the program execution, viz, whether or not the system operates in a first control mode in which the drive voltage $V_T$ is produced in accordance with the first function $f_1(t)$. If the system has operated in the first control mode viz, the answer is "yes," the program goes to a step $P_{52}$ in which it is determined whether or not the outside air temperature $T_A$ is lower than the reference level $T_{AO}$. If the outside temperature is lower than the reference level $T_{AO}$, viz, the answer is "yes," the program goes to a step $P_{53}$ in which the whether or not the engine cooling water temperature $T_W$ is lower than the reference level $T_{WO}$. If the cooling water temperature $T_W$ is lower than two, viz, the answer is "yes," the program goes to a step $P_{54}$ in which the first control mode for the production of drive voltage $V_T$ is set, and the drive voltage $V_T$ is produced in accordance with the first function $f_1(t)$ in a step $P_{56}$. If the answer is "no" in any of the steps $P_{51}$ to $P_{53}$, the program goes to a step $P_{55}$ in which a second control mode for the production of the drive voltage $V_T$ in accordance with the second function $f_2(t)$ is set, and the drive voltage $V_T$ is produced in accordance with the second function $f_2(t)$ in a step $P_{57}$. After the step $P_{56}$ or the step $P_{57}$, the program goes to the step $P_6$ shown in FIG. 7.

The characteristic of the blower fan motor voltage $V_T$ produced in the timer control mode is the same as the previous embodiment, which is shown in FIGS. 5 and 6.

It will be understood by those skilled in the art that the foregoing decription is in terms of a preferred embodiment of the present invention wherein various changes and modifications may be made without departing from the spirit and scope of the invention as set forth in the appended claims.

For example, the passenger compartment air temperature may be used in place of the outside air temperature in the timer control mode, since the temperature in the passenger compartment is almost equal to the outside air temperature during a period after the starting of the air conditioning system operation. In addition, the system also may be constructed so that a temperature at an evaporator of a cooling unit is utilized in addition to the engine cooling water temperature for determining the increasing rate of the air flow. In such a case, the air flow rate is gradually increased during a period when an evaporator temperature is above a predetermined reference level, and the air flow rate is rapidly increased when the evaporator temperature has reached the reference level.

What is claimed is:

1. An air quantity control method for an automobile air conditioning system including a blower fan, and a heat source, comprising the steps of:
    (a) monitoring an ambient temperature condition of the automobile to detect a predetermined ambient temperature condition;
    (b) sensing the temperature of said heat source; and
    (c) setting operation of the blower fan speed in accordance with a timed mode when said predetermined ambient condition is detected, said setting step including the further steps of
    (d) controlling the blower fan speed in accordance with a first mode of operation in which the blower fan speed is gradually increased with time when said sensed temperature is lower than a predetermined reference level, and
    (e) controlling the blower fan speed in accordance with a second mode of operation in which the blower fan speed is more rapidly increased than that in the first mode of operation when said sensed temperature is higher than said predetermined reference level or when said ambient temperature condition is other than said predetermined ambient temperature condition.

2. A control method as claimed in claim 1, wherein said ambient temperature is an outside air temperature, said heat source comprises an engine cooling water of an engine of the automobile, and wherein said predetermined ambient temperature condition is a condition where the outside air temperature is lower than a predetermined level.

3. A control method as claimed in claim 1, further comprising a step of presetting a reference level of a temperature in a passenger compartment of the automobile and a step for sensing the temperature in the passenger compartment, and wherein an upper limit level of the blower fan speed which changes with the absolute value of the temperature difference between the reference level and the sensed value of the passenger compartment air temperature is established in said blower fan speed controlling step.

4. An air quantity control system for an automobile air conditioning system including a blower fan, a heat source, and a cooling source, comprising:
    (a) means for monitoring an ambient temperature condition of the automobile to detect a predetermined ambient temperature condition;
    (b) a sensor for sensing the temperature of said heat source; and (c) means for setting operation of the blower fan speed in accordance with a timed mode when said predetermined ambient condition is detected, said setting means further including first means for controlling the blower fan speed in accordance with a first mode of operation in which the blower fan speed is gradually increased with time when said sensed temperature is lower than a predetermined reference level, and second means for controlling the blower fan speed in accordance with a second mode of operation in which the blower fan speed is more rapidly increased than that in the first mode of operation when said sensed temperature is higher than said predetermined reference level or when said ambient temperature condition is other than said predetermined ambient temperature condition.

5. A control system as claimed in claim 4, wherein said ambient temperature is an outside air temperature, said heat source comprises an engine cooling water of an engine of the automobile, and wherein said predetermined ambient temperature condition is a condition where the outside air temperature is lower than a predetermined level.

6. A control system as claimed in claim 4, further comprising a means for presetting a reference level of a temperature in a passenger compartment of the automobile, and a sensor means for sensing the temperature in the passenger compartment, and wherein said blower fan speed setting means further comprises a means for producing an upper limit of the blower fan speed which varies with the absolute value of the temperature difference between the reference level and the sensed value of the passenger compartment air temperature, thereby limiting the blower fan speed at the upper limit level both in the first and second modes of operation.

7. A control system as claimed in claim 4, wherein said setting means comprises a microcomputer including a central processing unit for executing various arithmetic operation in accordance with programs, a read-only memory for storing programs, and a random access memory for storing calculated results produced by said central processing unit in accordance with the program stored in said read-only memory during execution of the arithmetic operations.

8. An air quantity control system for an automobile air conditioning system including a blower fan, a heat source, and a cooling source, comprising:
   (a) means for monitoring ambient temperature condition of the automobile to detect a predetermined ambient temperature condition;
   (b) a sensor for sensing the temperature of said heat source;
   (c) a device for presetting a reference level of the temperature in a passenger compartment of the automobile;
   (d) a sensor for sensing the temperature in the passenger compartment;
   (e) a microcomputer which includes;
      (1) a central processing unit for executing various arithmetic operations in accordance with programs therefor;
      (2) a read-only memory for storing programs;
      (3) a random-access memory for storing calculated results produced by said central processing unit in accordance with the program stored in said read-only memory during execution of the arithmetic operations, said central processing unit producing an upper limit level of a blower fan speed on the basis of the reference level of the passenger compartment air temperature, and a sensed value of the passenger compartment air temperature, said upper limit level varying with the absolute value of the temperature difference between the reference level and the sensed value of the passenger compartment air temperature, and a control level including a first level in which the blower fan speed is increased gradually with time when said sensed source temperature is lower than a predetermined reference level under said predetermined ambient temperature condition, and a second level in which the blower fan speed is more rapidly increased than that in the first control level when said sensed source temperature is higher than said reference level under said predetermined ambient temperature condition or when said ambient temperature condition is other than said predetermined ambient temperature condition, and outputting the lower one of said upper limit level and said control level as a blower fan speed signal; and
   (f) a control means for controlling the blower fan speed in accordance with said blower fan speed signal produced by the microcomputer.

9. A control system as claimed in claim 8, wherein said ambient temperature is an outside air temperature, said heat source comprises an engine coolant of an engine of the automobile, and wherein said predetermined ambient temperature condition is a condition where the outside air temperature is lower than a predetermined level.

10. A blower fan speed control system for an automobile air conditioner having a blower fan, heating means utilizing the heat of a cooling water of the engine, and cooling means, the system comprising:
   means for sensing an ambient temperature,
   means for sensing a water temperature of the engine cooling water,
   control means, connected with said ambient temperature sensing means and said water temperature sensing means, for producing a control signal, said control means being operable for producing said control signal in accordance with a normal blower fan speed control mode, and a time-related blower fan speed control mode which comprises a first control mode in which the blower fan speed is gradually increased with time and a second control mode in which the blower fan speed is increased with time more rapidly than in said first control mode, said control means producing said control signal in accordance with said first control mode when the sensed ambient temperature is lower than a predetermined reference ambient temperature and at the same time the sensed water temperature is lower than a predetermined reference water temperature; said control means producing said control signal in accordance with said second control mode when the sensed ambient temperature is lower than said reference ambient temperature but the sensed water temperature is higher than said reference water temperature; said control means producing said control signal in accordance with said normal control mode when the blower fan speed determined in accordance with said time-related control mode is higher than the blower fan speed determined in accordance with said normal control mode, and actuator means for controlling the blower fan speed in accordance with said control signal.

11. The blower fan speed control system according to claim 10, wherein said control means is further operable for producing said control signal in accordance with said second control mode when the sensed ambient temperature is higher than said reference ambient temperature.

12. The blower fan speed control system according to claim 11, further comprising means for detecting closure of a blower fan switch to switch on the blower fan, and wherein said control means is connected with said detecting means and starts the control action of said time-related control mode when a closure of the blower fan switch is detected.

13. The blower fan speed control system according to claim 12, wherein said means for sensing an ambient temperature includes means for sensing air temperature outside the automobile.

14. The blower fan speed control system according to claim 12, wherein said ambient temperature is the temperature of the air within the passenger compartment.

15. The blower fan speed control system according to claim 10, further comprising means for sensing a compartment temperature within the passenger compartment, and wherein said control means is connected with said compartment temperature sensing means and performs the control action of said normal control mode so that the blower fan speed is increased with an increase of the absolute value of a difference between the sensed compartment temperature and a predetermined desired compartment temperature.

16. The blower fan speed control system according to claim 10, further comprising means for sensing the temperature of an evaporator of the cooling means and wherein said control means is operable for producing said control signal in accordance with said first control mode when the sensed ambient temperature is higher than said reference ambient temperature and the sensed evaporator temperature is higher than a predetermined evaporator temperature, and in accordance with said second control mode when the sensed ambient temperature is higher than said reference ambient temperature but the sensed evaporator temperature is lower than said reference evaporator temperature.

17. The blower fan speed control system according to claim 10, wherein said control means comprises a first operation circuit means for determining a basic value of said control signal in accordance with said normal control mode, a second operation circuit means for determining a time-related value of said control signal in accordance with said time-related control mode, and a comparator circuit means connected with said first and second operation circuits for comparing said basic value and said time-related value.

18. The blower fan speed control system according to claim 10, wherein said control means comprises a digital microcomputer.

19. A blower fan speed control method for an automobile air conditioner having a blower fan, heating means utilizing the heat of a cooling water of the engine and cooling means, the method comprising the steps of
sensing an ambient temperature,
sensing a water temperature of the engine cooling water,
preparing a normal blower fan speed control mode and a time-related blower fan speed control mode comprising a first control mode in which the blower fan speed is increased gradually with time and a second control mode in which the blower fan speed is increased with time more rapidly than in said first control mode
producing a first control signal in accordance with said first control mode when the sensed ambient temperature is lower than a predetermined reference ambient temperature and at the same time the sensed water temperature is lower than a predetermined reference water temperature; producing a second control signal in accordance with said second control mode when the sensed ambient temperature is lower than said reference ambient temperature but the sensed water temperature is higher than said reference water temperature; and further producing a normal control signal in accordance with said normal control mode when the blower fan speed determined in accordance with said normal control mode, and
controlling the blower fan speed in accordance with said control signal.

20. The blower fan speed control method according to claim 19, wherein, in said signal producing step, said second control signal is also produced in accordance with said second control mode when the sensed ambient temperature is higher than said reference ambient temperature.

* * * * *